W. REDDELL.
FOLDING BED ATTACHMENT FOR MOTOR VEHICLES.
APPLICATION FILED NOV. 9, 1915.
1,204,592.
Patented Nov. 14, 1916.
2 SHEETS—SHEET 1.
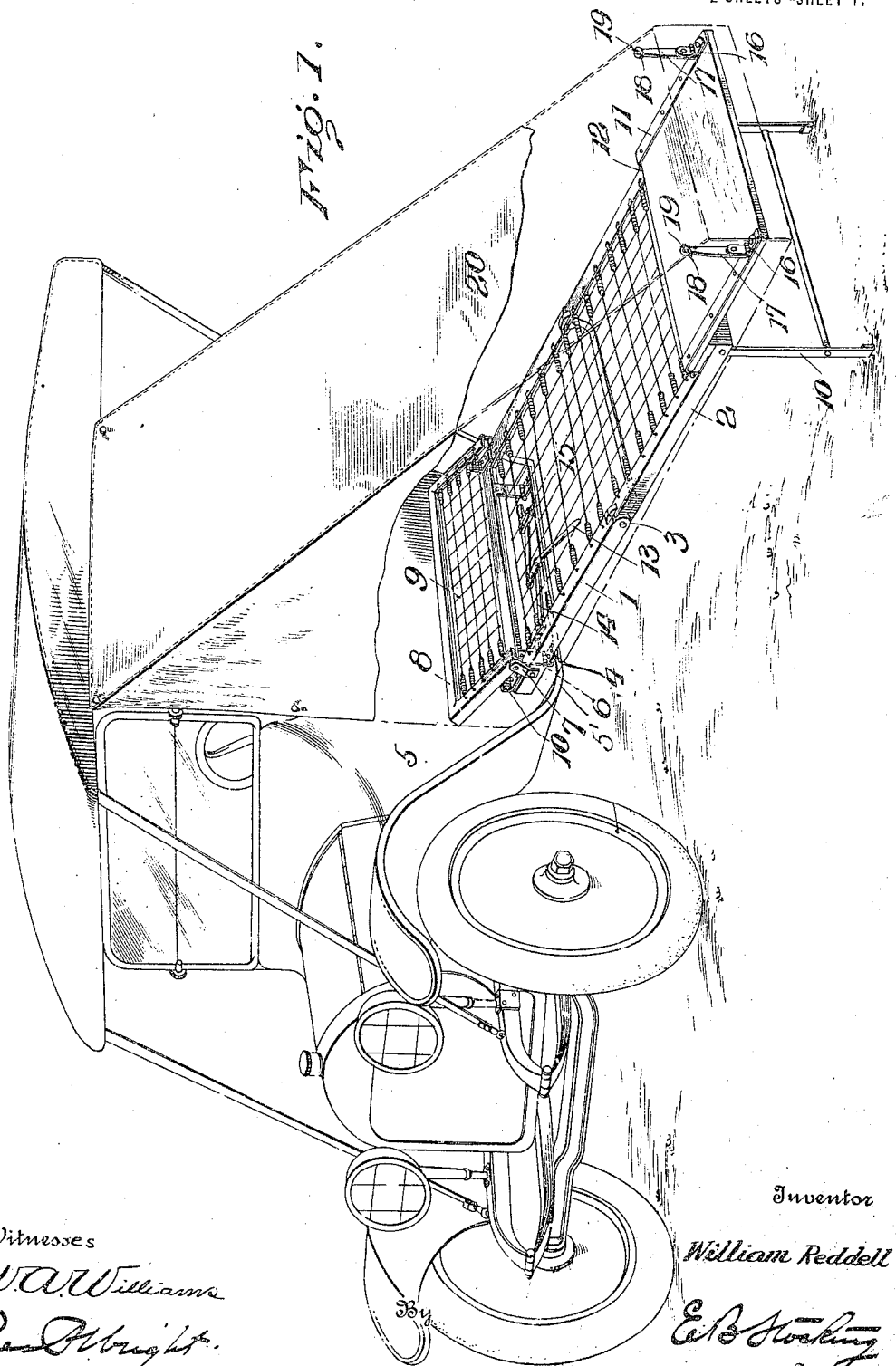
Witnesses
W. A. Williams
Inventor
William Reddell
By E. B. Hocking
Attorney

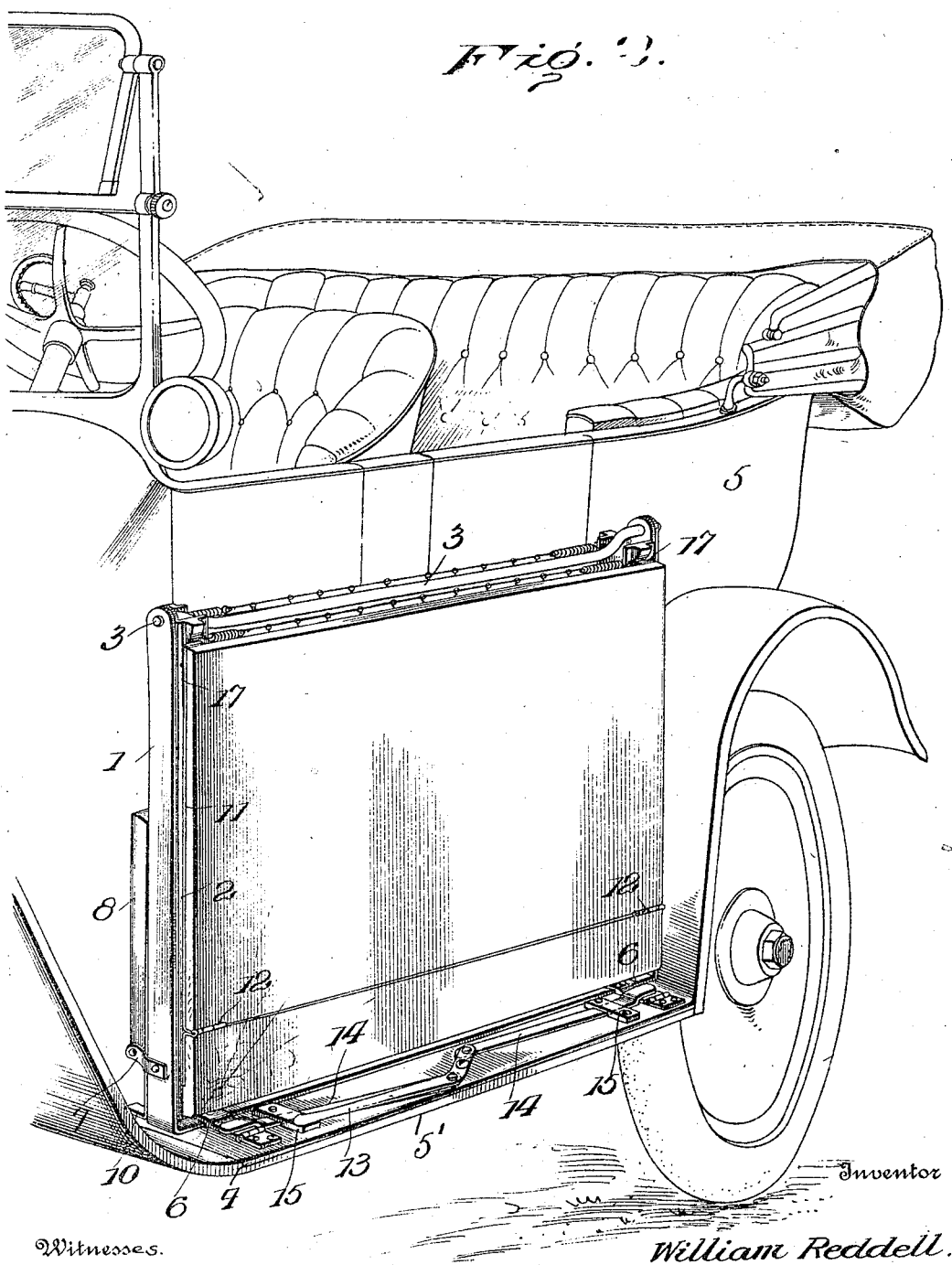

UNITED STATES PATENT OFFICE.

WILLIAM REDDELL, OF DENVER, COLORADO.

FOLDING-BED ATTACHMENT FOR MOTOR-VEHICLES.

1,204,592.  Specification of Letters Patent.  Patented Nov. 14, 1916.

Application filed November 9, 1915. Serial No. 60,515.

*To all whom it may concern:*

Be it known that I, WILLIAM REDDELL, a citizen of the United States, residing at Denver, in the county of Denver and State of Colorado, have invented certain new and useful Improvements in Folding-Bed Attachments for Motor-Vehicles, of which the following is a specification, reference being had therein to the accompanying drawing.

This invention relates to certain new and useful improvements in folding-bed attachments for motor vehicles, the object being to provide a folding bed which can be folded into very compact form on the running board of the vehicle.

Another object of my invention is to provide a folding-bed so that when the same is arranged in set-up position, a support for a canopy is formed.

Another object of the invention is to provide a folding-bed which is constructed and mounted upon the running board of the motor vehicle so that the same can be readily unfolded into position to be used as a bed and one, which when in folded position is inclosed by the foot member thereof.

Another and further object of the invention is to provide novel means for holding the bed in folded position on the running board of the vehicle.

Other and further objects and advantages of the invention will be hereinafter set forth and the novel features thereof defined by the appended claims.

In the drawings, Figure 1, is a perspective of my improved construction of folding-bed showing the application of the same to a motor vehicle; and Fig. 2, is a perspective of the folding-bed in folded position on the running board of the motor vehicle.

Like numerals of reference refer to like parts in the two figures of the drawings.

In carrying out my invention, I employ a sectional bed-frame formed of two sections 1 and 2, pivotally connected together as shown at 3 and provided with the usual fabric bottom for supporting the mattress.

The frame 1 is connected to a supporting board 4 mounted on the running board 5 of the motor vehicle 5 by hinges 6 formed with a short leaf and a long leaf; the long leaf being connected to the frame 1, as clearly shown in Fig. 1, so as to allow the frame to be swung upwardly and rearwardly into engagement with the running board.

Pivotally connected to upwardly projecting ears 7 carried by the frame 1 is a head-rest 8 having a fabric bottom 9; said head-rest being held in an inclined position by stops 10 carried by the frame 1.

In order to provide means for supporting the sectional bed frame formed of the sections 1 and 2 in horizontal position when the same is extended as shown in Fig. 1, I provide the frame 2 with a pivoted leg-frame 10; the legs of which are of a sufficient length to support the bed-frame in a horizontal position. The leg-frame 10 is pivotally mounted within the side bars of the frame 2 and is adapted to be folded within the same, when not in use.

In connection with the section 2, I employ a foot-member 11 pivotally connected to the section 2 by hinges 12 so as to allow the same to be folded outwardly as shown in the position in Fig. 1, or into the position as shown in Fig. 2; said foot-member having panel boards forming a closure for the folded bed when in the position as shown in Fig. 2, whereby the same will be protected when not in use.

Mounted on the supporting-board 4 of the vehicle between the hinges 6 is a pivoted lever 13 and to each side of the pivot pin thereof is connected a lock bar 14 mounted in guides 15 and provided with offset ends adapted to embrace the long leaf of the hinges 6 so as to hold the bed in folded position, as shown in Fig. 2. By moving the lever into the position as shown in Fig. 1, the lock bars are thrown out of the path of travel of the hinges 6 so as to allow the bed to be extended into position to be used. The foot-member 11 is provided with hinges 16 adjacent its free end carrying supports 17 provided with reduced ends 18 adapted to fit within eyes 19 formed in a canopy 20 which is provided with suitable eyes so that the same can be readily attached to the buttons used for fastening curtains on the top of the motor vehicle as shown in Fig. 1, whereby a sleeping tent is formed so as to completely inclose the bed.

When the bed is in folded position on the running-board of the vehicle, the canopy is placed around the same so as to thoroughly protect the bed from the dirt and dust of traveling and is so constructed that it forms a cover for the bed which cover can be readily placed in position or removed therefrom and when removed therefrom when the bed is in extended position, it can be readily attached to the top of the vehicle and supported by the bed so as to form a tent for the person sleeping on the bed.

From the foregoing description, it will be seen that I have provided a folding bed which is carried by the running-board of the motor vehicle which forms a support for one end of the bed when it is in extended position and one which is capable of being folded into such position that it will not extend beyond the running board of the vehicle, the foot-member thereof, forming a closure for protecting the mattress which is adapted to be placed between the sections of the bed. It will also be seen that I have provided a folding-bed which forms a support for a canopy carried by the top of the vehicle so as to completely inclose the bed.

The supporting board 4 is preferably bolted on the running board of the motor vehicle so that the same can be readily attached or detached in order to remove the bed entirely from the vehicle and by this construction I am able to attach my improved construction of folding bed to various constructions of automobile, regardless of the construction of running board employed on such vehicle.

I claim:

1. The combination with a running board of a motor vehicle, of hinges mounted thereon, a sectional bed frame connected to said hinges, and lever operated locking bars mounted upon said running board embracing said hinges for holding said bed in folded position.

2. The combination with the running board of a motor vehicle, of hinges mounted thereon, a sectional bed-frame carried by said hinges, a pivoted leg-frame carried by said sectional bed, a foot-member, and means carried by said running board coöperating with said hinges for locking said bed in folded position.

3. A folding-bed, comprising a pair of sections pivotally connected together, leg-frames carried by one of said sections, hinges connected to the other of said sections, a support for said hinges, and a pair of locking bars mounted upon said support coöperating with said hinges for holding said sections in folded position.

4. The combination with the running board of a motor vehicle, of a sectional bed-frame pivotally connected thereto, and capable of being extended into horizontal position or folded into vertical position upon said running board, a head-rest pivotally mounted upon one of the sections of said bed, a foot-member pivotally mounted upon the other section of said bed, means carried by the free section of said bed for supporting the bed when in horizontal position, and means mounted upon the running board of the vehicle for locking said bed in folded position.

5. A folding-bed for motor vehicles, comprising a pair of pivotally connected sections capable of being folded one within the other, one of said sections being pivotally connected to said vehicle, a pivoted leg-frame carried by the free section of said bed for supporting the bed in horizontal position, a foot member mounted upon said free section and capable of being extended outwardly therefrom, and means carried by said motor vehicle for locking said sections in folded position, said foot member forming a closure for said section when in folded position.

6. The combination with the running board of a motor vehicle, of a pair of hinges secured on said running board, a folding-bed carried by said hinges, a lever mounted upon said running board, a pair of lock bars carried by said lever and capable of moving into and out of the path of travel of said hinges for locking and releasing said hinges for holding said folding-bed in folded position.

7. The combination with a motor vehicle, having a running board, of a folding-bed carried by said running board and capable of being extended into horizontal position, legs for supporting said bed when in horizontal position, a foot-board carried by said bed and capable of being extended outwardly therefrom, supports carried by said foot board, and a canopy carried by said vehicle mounted upon said supports.

8. The combination with a motor vehicle, of a supporting board carried thereby, hinges mounted upon said board, a sectional bed-frame connected to said hinges, and means for locking a leaf of said hinges in contact with said board for holding said bed in folded position.

In testimony whereof I affix my signature in presence of two witnesses.

WILLIAM REDDELL.

Witnesses:
ARTHUR T. SMALE,
F. J. WOLOWSKY.